Figure 1:
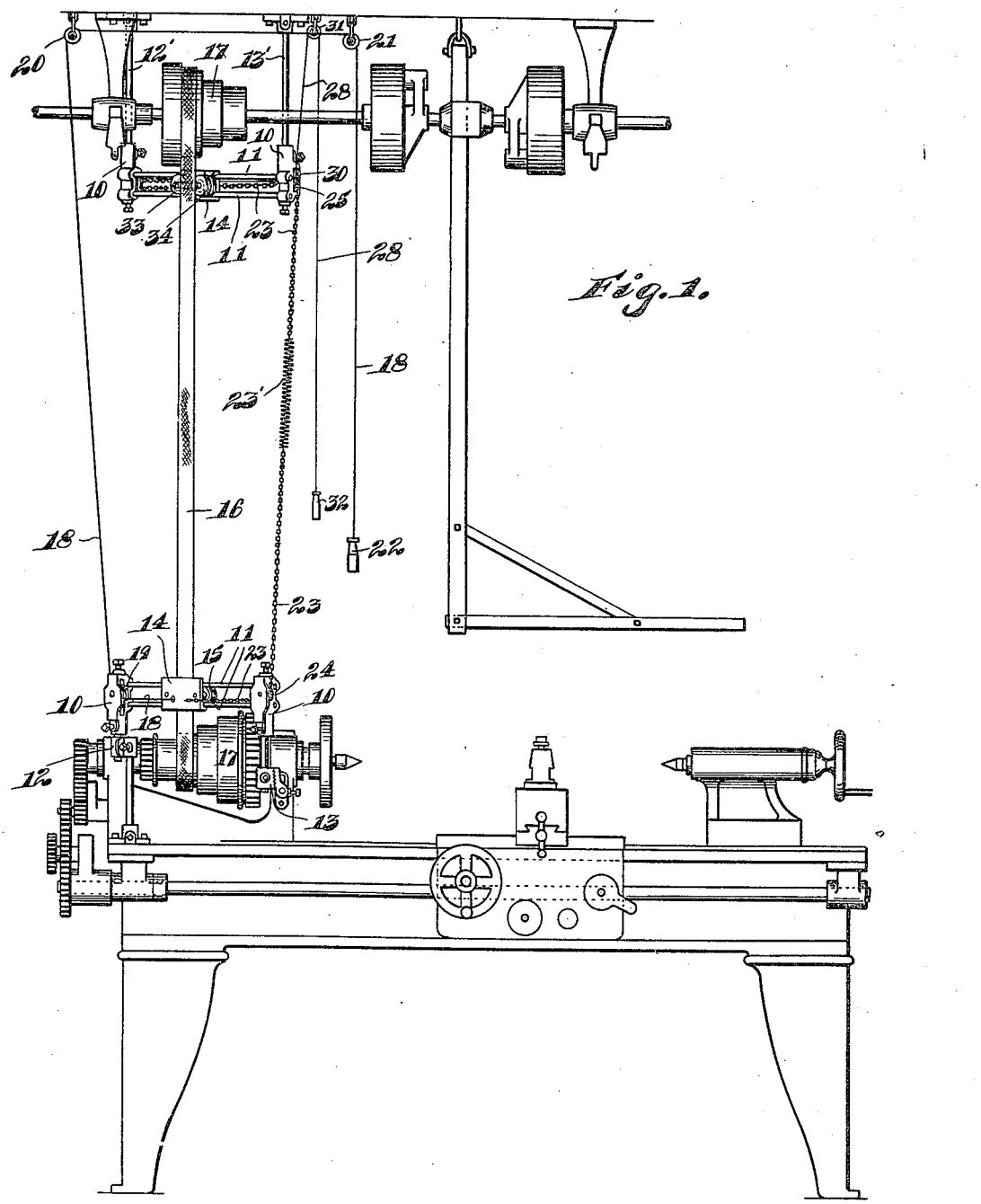

E. E. JONES.
CONE BELT SHIFTER.
APPLICATION FILED MAR. 10, 1919.
1,421,485.
Patented July 4, 1922.
3 SHEETS—SHEET 2.
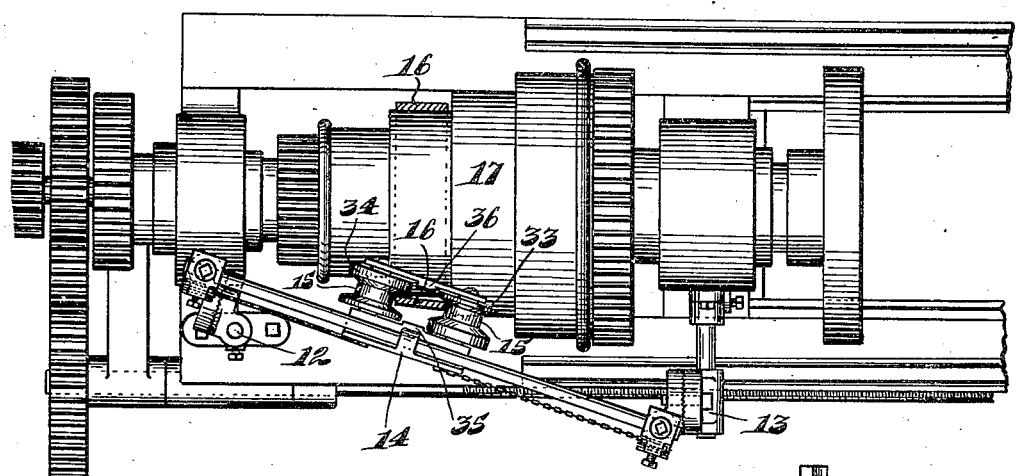
Fig. 2.
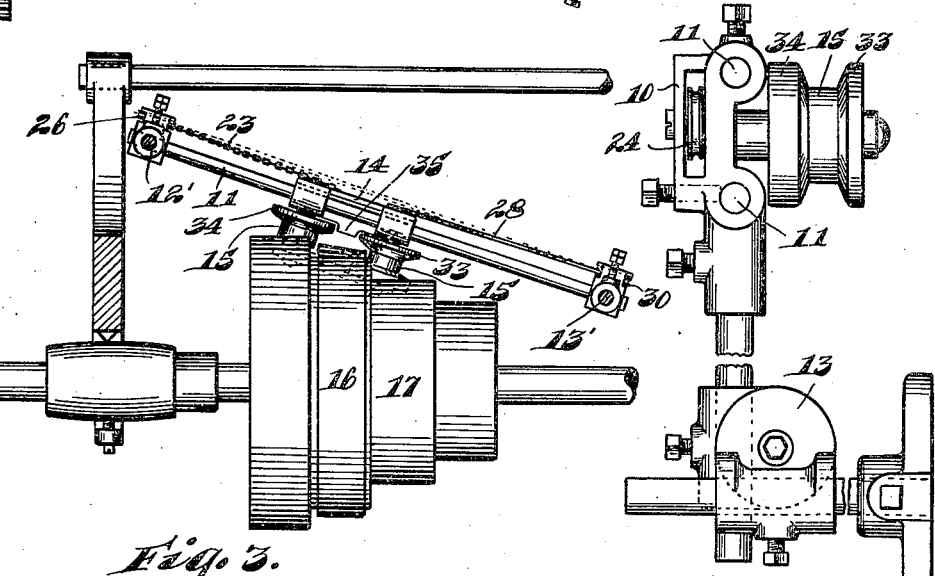
Fig. 3.
Fig. 4.
Witnesses:
C. E. Wessels.
B. G. Richards
Inventor:
Emerald E. Jones,
By Joshua R. H. Potts
Attorney.

E. E. JONES.
CONE BELT SHIFTER.
APPLICATION FILED MAR. 10, 1919.
1,421,485. Patented July 4, 1922.
3 SHEETS—SHEET 3.
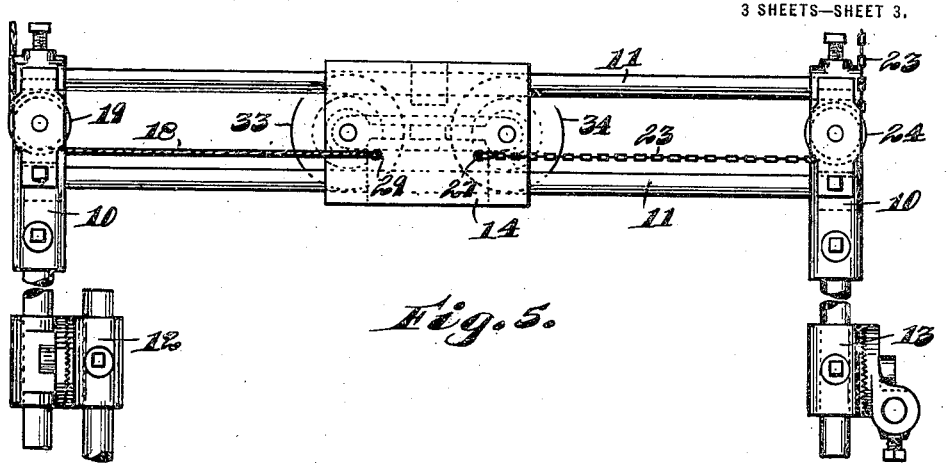
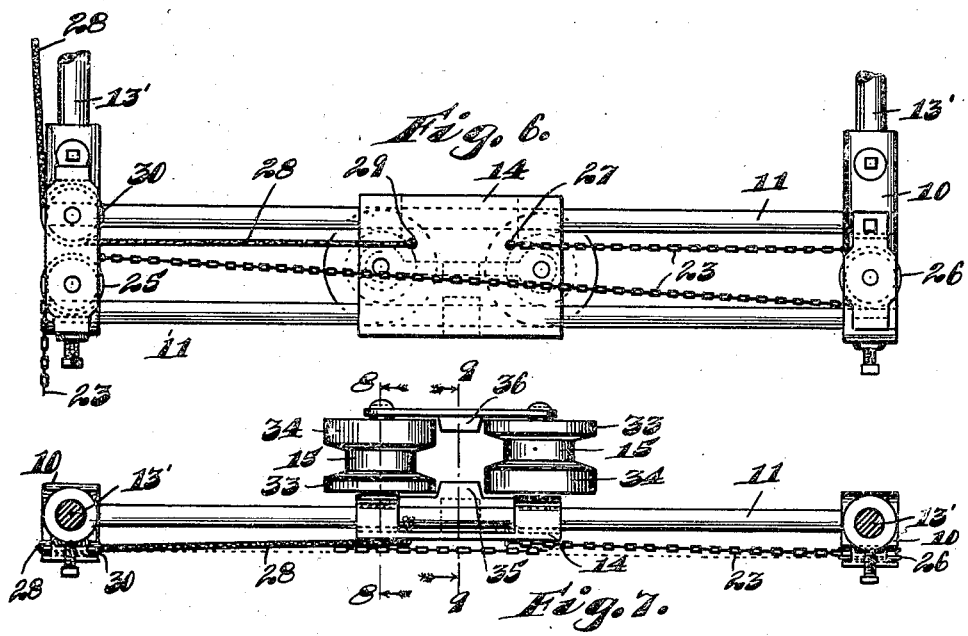
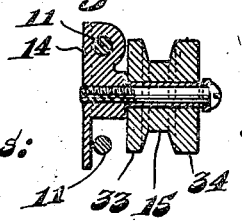
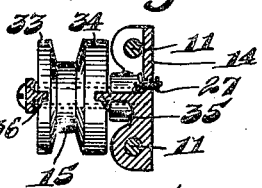
Witnesses:
C. E. Wessels.
B. G. Richards
Inventor:
Emerald E. Jones,
By Joshua R. H. Potts
Attorney.

UNITED STATES PATENT OFFICE.

EMERALD E. JONES, OF CHICAGO, ILLINOIS.

CONE BELT SHIFTER.

1,421,485.   Specification of Letters Patent.   Patented July 4, 1922.

Application filed March 10, 1919. Serial No. 281,645.

*To all whom it may concern:*

Be it known that I, EMERALD E. JONES, a subject of the King of Great Britain, and a resident of the city of Chicago, county of Cook, and State of Illinois, have invented certain new and useful Improvements in Cone Belt Shifters, of which the following is a specification.

My invention relates to improvements in cone belt shifters and has for its object the provision of an improved device of this character, whereby the belt on cone pulleys may be readily and efficiently shifted without danger to the operator.

Other objects will appear hereinafter.

The invention consists in the combinations and arrangements of parts hereinafter described and claimed, The invention will be best understood by reference to the accompanying drawings forming a part of this specification, and in which, Fig. 1, is a front view of a belt shifter embodying the invention, shown in position of use in conjunction with an ordinary lathe, Fig. 2, a top plan view of the lathe cone pulley showing the adjoining parts of the belt shifter, Fig. 3, a top plan view of the cone pulley co-operating with the lathe cone pulley and showing the adjoining portions of the belt shifter, Fig. 4, a detail end view of the lower shifting element, Fig. 5, a face view of the lower shifting element, Fig. 6, a rear view of the upper shifting element, Fig. 7, a top plan view corresponding to Fig. 6, Fig. 8, a section taken on line 8—8 of Fig. 7, and Fig. 9, a section taken on line 9—9 of Fig. 7.

The preferred form of construction, as illustrated in the drawings, comprises lower and upper belt shifting elements, each comprising end members 10 and two parallel guide rods 11, as shown. The lower shifter element is equipped with depending adjustable brackets 12 and 13 adapted to be secured to the head of an ordinary lathe or other like machine, with the guide rods 11 adjacent the lead-on side of the cone pulley and substantially parallel to the average taper thereof. Likewise, the upper belt shifting element is similarly mounted on suitable brackets or hangers 12' and 13' depending from the ceiling or other suitable support. Each of the belt shifter elements is equipped with a carriage 14 sliding upon the guide rods 11 and carrying grooved pulleys or rollers 15 adapted to engage the usual belt 16, operating over the usual upper and lower cone pulleys 17 for shifting said belt on said cone pulleys. The carriage 14 on the lower shifting elements is connected with one end of a flexible cable or cord 18 which extends thence through the corresponding end 10 under a suitable guide pulley 19, thence upwardly over guide pulleys 20 and 21, depending from the latter and equipped with an operating handle 22 hanging in convenient operative relation with the front portion of the lathe. The lower carriage 14 is also connected with one end of a chain 23 leading thence under a guide pulley 24 in the other end 10 and thence upwardly through a tension spring 23' and over a guide pulley 25 in the corresponding end of the upper shifter, said chain 23 leading thence entirely across the upper shifter around a guide pulley 26 and back to the carriage 14, being secured to the latter at the point 27 as best shown in Figs. 6 and 7. A flexible cord or cable 28 is secured to the upper carriage 14 at the point 29, passing thence under a guide pulley 30 through the corresponding end 10, thence upwardly over a guide pulley 31 and depending therefrom and equipped with an operating handle 32 adjacent the handles 22 on the cable 18, as indicated. By this arrangement it will be observed that by pulling downwardly upon the handle 22, the lower carriage 14 will be shifted to the left, carrying the belt 16 from a larger onto a smaller pulley surface, which movement is readily accomplished. This movement of the lower carriage 14 places the spring 23' under tension, thus exerting a spring tension on the upper carriage 14 tending to shift the belt onto the next larger pulley surface but not compelling immediate shifting thereof, permitting of delayed action. This permits of time to complete the shifting of the lower end of the belt 16 off of the larger pulley surface, so as to give slack in the belt permitting of its movement onto the larger upper pulley surface. which will be immediately effected by the force exerted by the tension thus introduced into spring 23'.

Likewise, by pulling downwardly on the handle 32, the upper end of the belt 16 will be correspondingly shifted from a larger onto a smaller pulley surface and a corresponding delayed spring action exerted on the lower end of the belt to shift it onto the next larger pulley surface as soon as the slack created by the upper shifting is available for such purpose. Thus, by a single manipulation or downward pulling upon either of the handles 22 or 23, a corresponding shifting of the belt 16 may be effected to vary the speed of the lathe or other tool, without necessitating touching of the belt by the operator, thus tending to avoid accidents, which frequently occur in this manipulation.

The grooves in the pulleys 15 are formed by flanges 33 and 34, of unequal widths, and the pulleys in each pair are oppositely arranged, as shown, so as to guide the belt 16 at an angle to the guide rods 11 and substantially parallel to the pulley surfaces of the cone pulleys, as indicated. Guard lips 35 and 36 are formed on the carriages 14, projecting between the flanges of the pulleys 15, to prevent the edges of the belt 16 from working in between the pulleys and the carriage frame.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with two oppositely arranged cone pulleys and a belt therefor, of a guide adjacent each pulley; a carriage slidable on each guide; a belt guide on each carriage engaging said belt; means for positively operating each of said carriages to shift the corresponding portion of the belt from a larger onto a smaller pulley; and a tension spring associated with said carriages for effecting delayed operation of one of the carriages for shifting said belt from a smaller onto a larger pulley, substantially as described.

2. The combination with two oppositely arranged cone pulleys and a belt therefor, of a guide arranged adjacent the lead-on side of each pulley and substantially parallel to the line of average taper thereof; a carriage slidable on each guide; belt guiding rollers on each carriage engaging said belt; means for positively operating each of said carriages to shift the corresponding portion of the belt from a larger onto a smaller pulley; and an operative connection between said carriages for effecting delayed operation of the other carriage for shifting said belt from a smaller onto a larger pulley surface, substantially as described.

3. The combination with two oppositely arranged cone pulleys and a belt therefor, of a guide arranged adjacent the lead-on side of each pulley and substantially parallel to the line of average taper thereof; a carriage slidable on each guide; belt guiding rollers on each carriage engaging said belt; means for positively operating each of said carriages to shift the corresponding portion of the belt from a larger onto a smaller pulley; and a spring connection between said carriages for effecting delayed action of the other carriage, substantially as described.

4. The combination with two oppositely arranged cone pulleys, arranged one above the other, and a belt therefor, of a guide arranged adjacent the lead-on side of each pulley and substantially parallel to the line of average taper thereof; a carriage slidable on each guide; belt guiding rollers on each carriage engaging said belt; a flexible cable connected with the carriage on the upper guide extending thence to one end of said guide, there being a guide pulley at said guide end over which said cable is passed; a guide pulley mounted above said upper guide and over which said cable is passed, depending therefrom in operative relation with the lower cone; a flexible element secured at the other end of the carriage on said upper guide extending thence to the corresponding end of said upper guide, there being a guide pulley over which said flexible element is passed and said flexible element being thence brought back across said upper guide to the opposite end thereof, there being a guide pulley at said opposite end over which said flexible element is passed, said flexible element extending thence downwardly to said lower guide and having a tension spring incorporated therein, said flexible element having its lower end connected with the carriage on the lower guide to effect movement of said lower carriage in a direction opposite to the movement of said upper carriage; and a flexible cable secured to the carriage on said lower guide, extending thence in a direction opposite to said flexible element, there being a guide pulley at the corresponding end of said lower guide under which said last mentioned flexible cable is passed, and there being one or more guide pulleys suspended above said lower guide and over which said flexible cable is passed depending therefrom in operative relation with said lower cone, substantially as described.

5. Guide pulleys for belt shifters, said guide pulleys being arranged in pairs and flanged to form guide grooves, the flanges on said pulleys being of enequal widths and oppositely arranged; and guard members projecting between said pulleys to prevent displacement of said belt, substantially as described.

6. The combination with two oppositely arranged cone pulleys and a belt therefor, of a guide adjacent each pulley; a carriage slidable on each guide for shifting said belt from a larger onto a smaller pulley; oppositely arranged rollers on each carriage for engagement with said belt; and belt guide members carried by each of said carriages between each of said rollers, substantially as described.

In testimony whereof I have signed my name to this specification in the presence of two subscribing witnesses.

EMERALD E. JONES.

Witnesses:
JOSHUA R. H. POTTS,
HELEN F. LILLIS.